Sept. 12, 1961 E. J. BEDARD ET AL 2,999,401
DRIVE FOR RECIPROCATING POWER PUMPS AND THE LIKE
Filed Nov. 28, 1958 2 Sheets-Sheet 1

INVENTORS.
Eugene J. Bedard
Donald F. Lippincott
BY Claude H. Nickell

Jennings, Carter & Thompson
Attorneys

Sept. 12, 1961 E. J. BEDARD ET AL 2,999,401
DRIVE FOR RECIPROCATING POWER PUMPS AND THE LIKE
Filed Nov. 28, 1958 2 Sheets-Sheet 2

INVENTORS.
Eugene J. Bedard
Donald F. Lippincott
BY Claude H. Nickell

Jennings Carter & Thompson
Attorneys

United States Patent Office 2,999,401
Patented Sept. 12, 1961

2,999,401
DRIVE FOR RECIPROCATING POWER PUMPS AND THE LIKE
Eugene J. Bedard and Donald F. Lippincott, Detroit, and Claude H. Nickell, Dearborn, Mich., assignors to The Wheland Company, a corporation of Tennessee
Filed Nov. 28, 1958, Ser. No. 776,977
1 Claim. (Cl. 74—801)

Our invention relates to heavy duty drives for reciprocating members such for instance as the reciprocating plungers or pistons of positive displacement pumps. While not specifically limited thereto our invention finds particular utility in connection with slush pumps for oil well drilling.

It is a general object of our invention to provide a drive for reciprocating members such as the plungers or pistons of pumps which shall be more efficient, more compact, and more economical of manufacture than drives heretofore produced for this purpose.

A more specific object of our invention is to provide a drive for slush pumps which shall embody, in the main power train, a system of ring, sun and planetary gears, thus providing a large horsepower capacity drive in minimum space.

Our invention contemplates a drive for pumps which shall be especially adapted for the larger horsepower sizes, namely, sizes on the order of 700 to 1500 horsepower, and which, nevertheless, shall be capable of driving the pump with a higher reduction in the gear train, permitting a higher speed input shaft for the same pump speed than with the crank shaft type drives currently employed, and doing so in smaller space.

Another and important object of our invention is to provide a drive for slush pumps embodying a "floating" ring gear, planetary gears in mesh therewith, and a sun gear on the end of the main drive shaft, together with means to support the main drive shaft in cantilever fashion from one side only of the drive housing, whereby the sun gear is self-aligning relative to the planetary gears, and the ring gear floats slightly so that it may align itself to assure pitch line contact with each of the planet gears thereby at all times equalizing the load on each of the planetary gears. This object of our invention further makes possible a more accurate driving alignment of the several gears without the necessity for extreme dimension tolerances in the fabrication of the drive.

Another object of our invention is to provide a pump drive of the general character designated in which the housing and associated parts supported therefrom are so constructed that the drive may be converted from right to left hand drive simply by moving the main power shaft and its associated bearings from one side of the casing to the other.

Another object is to provide apparatus of the character designated in which the main power input shaft is of the full floating drive shaft type thereby minimizing the bending stresses in the drive shaft as aforesaid.

Still other objects are: to provide a drive of the character designated in which the guides for the crosshead ends of the connecting rods are cylindrical in configuration; to provide such guides which confine the piston rod in all planes rather than in vertical planes as with the presently existing shoes and slides; to provide guides which are more readily replaceable than are the presently existing slides and shoes; and to provide guides for the crosshead ends of the connecting rods in which the wear on the guides is distributed around the insides of cylinders rather than being concentrated on the faces of slides as at present.

Briefly, our invention contemplates a heavy duty drive for pumps and like reciprocating loads which comprises a housing fabricated of plates welded and bolted together as appropriate. Mounted inside the casing is an internally toothed ring gear held against rotation, but free to float eccentrically within reasonable limits to insure proper tooth engagement with the planet gears. Mounted in suitable roller bearings, to rotate concentrically relative to the ring gear is a planet gear carrier. Three planet gears are mounted on cross pins mounted in the carrier and are in mesh with the ring gear. The carrier has eccentric connections on each side thereof, displaced 90° angularly from each other on which are mounted drive discs. Carried on the periphery of these drive discs, on suitable anti-friction bearings, are the crank ends of connecting rods. The connecting rods extend forwardly and their forward ends are fitted with piston-like crossheads. These crossheads reciprocate back and forth in cylindrical guides which are removably secured in suitable manner to the housing. The fluid piston rods, or plungers, pass through suitable stuffing boxes and connect with rods extended from the crossheads.

Power for the gear train is supplied by a main power shaft which carries a sun gear on its inner end in mesh with the planet gears. The main shaft is supported in full floating fashion in a hollow carrier shaft in turn mounted in a bearing secured on one side of the housing. The main shaft thus projects in cantilever-like fashion into the center of the pinion and gear assembly whereby any slight misalignment of the entire housing and gears is equalized without undue bending stresses on the main drive shaft as the entire assembly rotates. Power is supplied through a suitable pulley or the like secured to the outer end of the carrier shaft. The housing preferably is provided with identically sized and bolted openings on each side so that the machine may be converted from right to left hand drive by the simple expedient of transferring the shaft and its bearing to the opposite side of the housing. Also, a small extension shaft is non-rotatably secured to the inner end of the main drive shaft and is supported in a bearing in the cover plate for the housing opposite the main shaft bearing. The small shaft may drive a self-contained lubricating means for supplying lubricant under pressure to the several parts of the drive.

Apparatus illustrating features of our invention is shown in the accompanying drawings forming a part of this application, in which.

Figure 1:
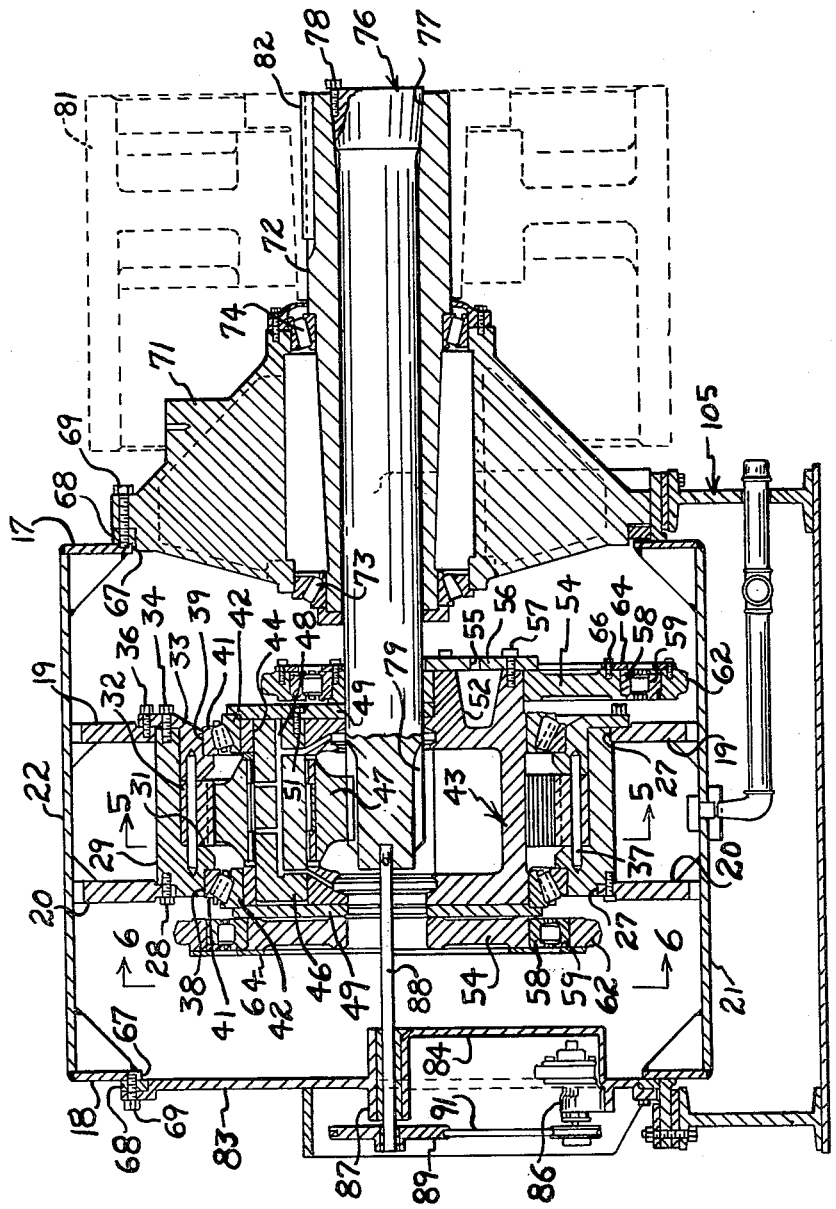
FIG. 1 is an enlarged detail sectional view showing our improved drive associated with an oil well slush pump, the projection on the carrier carrying the drive disc on the right hand side of the figure being 90° out of true angular position for the purpose of illustration.

Referring now to the drawings for a better understanding of our invention, our improved drive unit comprises generally a rugged frame made of plates of steel welded and otherwise secured together. Thus, the frame comprises side plates 17 and 18. There are a pair of vertically disposed plates 19 and 20 which are welded to a bottom plate 21 and a top plate 22. There are a number of cross plates all forming braces for the side, top and bottom plates and for the vertical plates 18 and 19. Thus, the entire framework is a rigid arrangement of plates capable of withstanding the stresses to be imposed thereupon.

The vertically extending plates 19 and 20 are provided with generally circular openings 27. Fitting in openings 27 and secured to the plate 20 by bolts 28 is a ring gear mounting member 29. The member 29 has a shoulder 31 thereon against which a side of the ring gear 32 abuts. The ring gear is held in place by means of a retainer 33 which is bolted to the supporting member 29 by bolts 34. A flange of the retaining member 33 is in turn bolted to plate 19 by bolts 36 as indicated. Thus, the ring gear 32, which is internally toothed as indicated, may be removed by first removing bolts 34 and 36 and then sliding the ring gear axially to the right as viewed in FIG. 2. The ring gear is held against rotation by means of a series of pins 37 which are located on equal centers and on a common circle for a purpose later to be explained. The holes in the ring gear are slightly larger than the pins 37 whereby the ring gear "floats" slightly.

The ring gear member 29 is provided with an internal seat 38. In similar manner the retainer 33 is provided with an internal seat 39. Fitting in the seats 38 and 39 are the outer races 41 of tapered roller bearings, the inner races 42 of which are mounted on suitable machined seats provided therefor on the outer periphery of a planet gear carrier indicated generally by numeral 43. It will be noted that the tapered roller bearings taper inwardly toward the ring gear, whereby the carrier is mounted for rotation and held centered against moving axially.

As best shown in FIG. 7 carrier 43 is provided with three equally spaced holes 44. Fitting in the holes 44 are pins 46. Mounted on pins 46 are planetary gears 47 which are in mesh with the ring gear 32. The pins are provided with suitable oil passages 48 as indicated.

The tapered roller bearings are held in assembled position by means of spacer plates 49 which are mounted alongside the gear carrier. Bolts 51 pass through plate 49 and into the pins 46, thus to hold the pins against rotation. Any suitable bearings such for instance as needle bearings 50, shown only in FIG. 5, may be used between the pins and the planetary gears 47.

The carrier 43 is provided on each side with an outstanding boss or projection 52. As best shown in FIGS. 7 and 8 the projections 52 are displaced 90° angularly from each other. Further, the carrier is provided at its center with an opening the purpose of which will later appear.

Mounted on the projections 52 are eccentric drive discs 54. The discs are held in place by means of plates 56 and bolts 57 which pass into holes 55 drilled in the faces of the projections or bosses 52.

Mounted on the peripheries of the discs 54 are the inner races 58 of roller bearings. The outer races 59 of these roller bearings are mounted on the inside of the bores 61 of the big or crank ends 62 of connecting rods indicated generally by the numeral 63. The outer peripheries of the drive discs 54 may be shouldered to receive the races 58. The bearings races 58 and 59 may then be held in place by means of a retainer ring 64 secured thereto by bolts 66.

The vertical side plate 17 is provided with a generally circular opening 67 therethrough. Surrounding the opening 67 is a reinforcing ring 68 which is welded in place. Fitting into the opening 67 and secured by bolts 69 is a bearing mounting block 71. This bearing block supports a hollow carrier shaft 72. Shaft 72 is mounted in bearings 73 and 74 for rotation in the bearing block 71.

The main power shaft and the shaft which carries the sun gear for the gear system already described is indicated generally by the numeral 76. The shaft 76 has a relatively short tapered section 77 at its outer end fitting in a complementarily tapered section provided in the outer end of the carrier shaft 72. Bolts 78 non-rotatably secure together shafts 72 and 76 and hold the tapered parts wedged together. It will be noted that the carrier shaft 72 is axially elongated and that except at the tapered portion 77, shaft 76 is unsupported throughout its length, the bore of the carrier shaft being larger than the diameter of shaft 76. Therefore, the inner end of shaft 76 projects into the center of the ring gear and planetary gear assembly in cantilever fashion.

Figure 2:
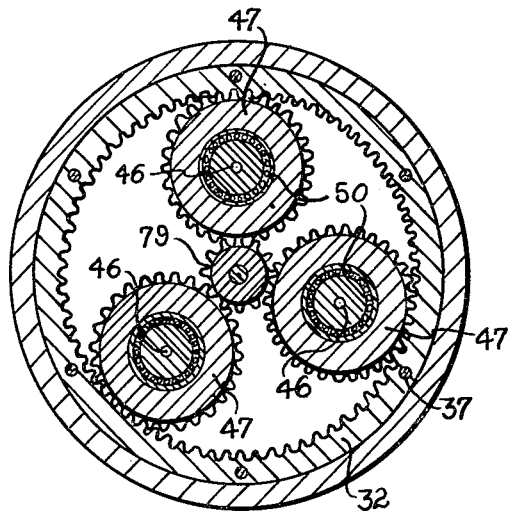
FIG. 2 is a detail sectional view taken generally along line 5—5 of FIG. 1; and, FIG. 3 is a somewhat diagrammatic view taken generally along line 6—6 of FIG. 1 and drawn to an enlarged scale, all parts between the crank ends of the connecting rods being omitted for the purpose of showing the relative dispositions of the same.
Figure 3:
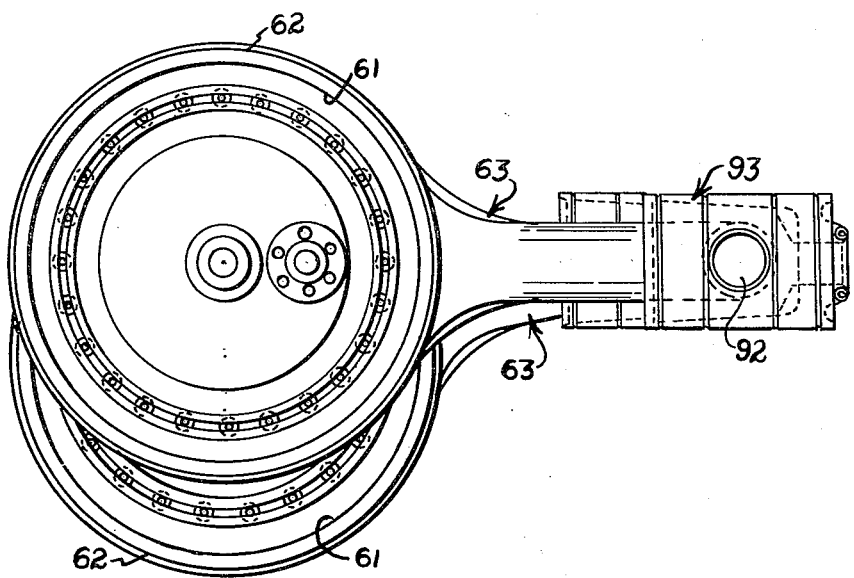

Formed integrally on the inner end of the shaft 76, or otherwise secured thereon, is a sun gear 79 which is in mesh with the three planet gears 47. A sheave 81, indicated in dotted lines in FIG. 2, is non-rotatably mounted on the outer end of the carrier shaft 72 by means of a key 82. Thus, power applied to sheave 81 is transmitted through the key 82, carrier shaft 72 and thence to the main power shaft 76 and into the gear train. It will thus be appreciated that the shaft 76 may be described as a substantially full floating shaft inasmuch as only a short section adjacent its outer end is rigidly mounted with respect to deflection.

The opposite vertical wall 18 of the housing also is provided with an opening 67 of identical shape and size and likewise has a reinforcing ring 68 thereabout. The bolts 69 on the left side of the housing as viewed in FIG. 2 hold in place a cover plate 83. Further, the disposition of the bolt holes into which the bolts 69 on both sides of the housing fit are identical so that the plate 83 may be installed in place of the bearing support 71, and vice-versa.

Mounted in a well 84 formed on a side of the plate 83 is a pump 86. A bearing 87 is provided for rotatably supporting a shaft 88. The shaft 88 is keyed into the end of the main shaft 76 as at 88 and carries a pulley 89 on its outer end. Pulley 89 drives pump 86 through a belt 91.

The crosshead ends of the connecting rods 63 are pivotally connected by cross pins 92 to piston-like crossheads indicated generally by the numeral 93. The crossheads 93 fit slidably in cylinder-like guides which are removably secured to the framework.

From the foregoing, the method of constructing and using our improved apparatus together with the advantages thereof may now be readily explained. With the parts assembled as indicated, power is supplied to the sheave 81 rotating shaft 72 and hence the main power shaft 76. This drives sun gear 79 which in turn rotates the pinions 47 against the fixed ring gear 32. This in turn drives carrier 43, rotating the same in the tapered roller bearings as indicated. Rotation of carrier 43 causes the eccentrically disposed projections 52 thereon to move in eccentric paths about the main shaft 76 thus in effect reciprocating the slides 93 and reciprocating the pistons of the pump. Due to the 90° angular displacement of the projections 52 on the carrier 43 it will be seen that the pistons of the pump are operated out of phase with each other.

In view of the fact that the inner end of the shaft 76 which carries the sun gear is not confined and can flex a few thousandths of an inch, it will be apparent that the end of the shaft carrying the sun gear is self-aligning relative to the pinions 47. By so mounting the main drive shaft 76 we have made possible the fabrication of the housing by welding and have eliminated the requirement of extreme accuracy in machining the openings therein as well as extreme accuracy in alignment of the several parts of the gear train.

It will be noted that the ring gear may be turned angularly in its mounting simply by removing the retainer 33 and pins 37, rotating the gear, and reinserting the pins and assembling the device again. Therefore, if the gear wears in local spots it may be turned so that the worn places are positioned in spots of lesser wear.

Due to the identical spacing of the bolt holes in the reinforcing ring 68, plate 83 may be readily exchanged with the bearing block 71 thus to make the machine right or left hand drive. Further, this may be done without disturbing in any way the gear system inasmuch as the sun gear on the end of shaft 76 slips into place in mesh with the pinions. Since the pinions are mounted on their pins 46 withdrawal of the shaft carrying the sun gear 79 does not disturb them.

If desired the entire unit may be mounted on a sled indicated generally by the numeral 105 whereby it may be pulled around to position the pump adjacent the well or otherwise.

From the foregoing it will be apparent that we have devised an improved drive for slush pumps and the like. In actual practice we have found that our invention is far simpler to construct and maintain than are the crank shaft type of pumps heretofore in use. Further, the apparatus is more friction free and smoother in operation than the present crank shaft types of slush pump drives. In addition we have found that we can increase the speed of the input shaft of the drive materially above that of drives of corresponding horsepower which embody cranks. The cylindrical slides and guides confine the little end of the connecting rods to true rectilinear paths, thus eliminating lateral strains on prior mechanisms which heretofore have occurred in some instances. We prefer to spiral the pinions 47 and sun gear 79 in such manner that the drive shaft 76 is pulled inwardly against its thrust bearings 73 and 74. This tends to hold the tapered portion 77 in good wedging and driving contact with the bore of the carrier shaft 72 and positively prevents endwise or axial movement of the shaft 76 in either direction. The self-centering or self-aligning feature of the sun gear relative to the planet gears eliminates materially the wear which otherwise would occur on the several parts of the gear train if the shaft 76 were journaled at each end.

While we have shown our invention in but one form, it will be obvious to those skilled in the art that it is not so limited, but is susceptible of various changes and modifications without departing from the spirit thereof, and we desire, therefore, that only such limitations shall be placed thereupon as are specifically set forth in the appended claim.

What we claim is:

In a planetary gear, a housing, an internally toothed ring gear nonrotatably mounted in the housing, at least three planet gears in mesh with the ring gear, a carrier for said planet gears having bearing pins thereon on which the planet gears are rotatably mounted, tapered roller thrust bearings embodying outer races fixedly mounted in the housing located on either side of the planet gears and supporting the carrier for rotation and holding it against thrust, a hollow carrier shaft, other thrust bearings mounted in the housing and supporting the carrier shaft for rotation and holding it against thrust, a power shaft having a relatively short section adjacent its outer end tapered inwardly of the power shaft and fitting in a complementarily tapered section on the carrier shaft, the remainder of the power shaft being unsupported throughout its length, whereby its inner end extends in cantilever fashion into the center of the gear system defined by the ring and planet gears, and a sun gear on the inner end of the power shaft in mesh with said planet gears.

References Cited in the file of this patent

UNITED STATES PATENTS

| | | |
|---|---|---|
| 444,592 | Grist | Jan. 13, 1891 |
| 2,295,076 | Cochran | Sept. 8, 1942 |
| 2,369,867 | Sprake | Feb. 20, 1945 |
| 2,543,811 | Snow et al. | Mar. 6, 1951 |
| 2,762,232 | Bade | Sept. 11, 1956 |
| 2,836,473 | Tydeman | May 27, 1958 |
| 2,893,268 | Liebel | July 7, 1959 |

FOREIGN PATENTS

| | | |
|---|---|---|
| 948,804 | France | Feb. 7, 1949 |